(12) United States Patent
Colaprisco et al.

(10) Patent No.: US 8,439,297 B2
(45) Date of Patent: May 14, 2013

(54) AIR INLET FOR AN AIRCRAFT TURBINE ENGINE, AN AIRCRAFT PROVIDED WITH SUCH AN AIR INLET, AND A METHOD OF OPTIMIZING THE OPERATION OF AN AIRCRAFT TURBINE ENGINE WITH THE HELP OF AN AIR INLET

(75) Inventors: Marc Colaprisco, Gignac la Nerthe (FR); Victor Gerin-Roze, Eguilles (FR)

(73) Assignee: Eurocopter, Marignane Cedex (FR)

( * ) Notice: Subject to any disclaimer, the term of this patent is extended or adjusted under 35 U.S.C. 154(b) by 390 days.

(21) Appl. No.: 12/941,467

(22) Filed: Nov. 8, 2010

(65) Prior Publication Data

US 2011/0108676 A1 May 12, 2011

(30) Foreign Application Priority Data

Nov. 12, 2009 (FR) ...................................... 09 05435

(51) Int. Cl.
*B64D 33/02* (2006.01)
(52) U.S. Cl.
USPC ..... 244/53 B; 137/15.1; 137/15.2; 60/39.091; 60/39.092
(58) Field of Classification Search .................. 244/53 B; 137/15.1, 15.2; 60/39.091, 39.092; 55/306
See application file for complete search history.

(56) References Cited

U.S. PATENT DOCUMENTS

| | | |
|---|---|---|
| 3,449,891 A | 6/1969 | Shohet et al. |
| 5,697,394 A | 12/1997 | Smith et al. |

FOREIGN PATENT DOCUMENTS

| | | |
|---|---|---|
| EP | 0075054 A1 | 3/1983 |
| FR | 1548724 A | 12/1968 |
| FR | 1585516 A | 1/1970 |
| FR | 2250671 B1 | 6/1975 |
| FR | 2538453 A1 | 6/1984 |
| FR | 2906569 A1 | 4/2008 |
| FR | 2924471 A1 | 6/2009 |
| GB | 577799 | 5/1946 |
| GB | 710946 A | 6/1954 |
| GB | 820366 A | 9/1959 |
| WO | 9705942 A1 | 2/1997 |

OTHER PUBLICATIONS

Search Report and Written Opinion, Application No. FR 09 05435; dated Jun. 25, 2010.

*Primary Examiner* — Timothy D. Collins
*Assistant Examiner* — Nicholas McFall
(74) *Attorney, Agent, or Firm* — Brooks Kushman P.C.

(57) ABSTRACT

The present invention relates to an air inlet (10) for a turbine engine (2) of an aircraft (1), the air inlet comprising an air delivery duct (20) defined by a side wall (21) and extended by a dynamic inlet duct (30), said dynamic inlet duct (30) extending along a dynamic axis (AX1) towards a front flow section (31), said dynamic inlet duct (30) being provided with a grid (40) for protection against ingesting foreign bodies. The grid (40) is suitable for moving in translation along said dynamic axis (AX1) relative to said front flow section (31), and said air inlet (10) includes at least one lateral inlet (50) arranged in said side wall (21) and cover means (41) for covering said lateral inlet (50) that are movable relative to said lateral inlet (50), said air inlet (10) including movement means (60) controlled by said movement in translation of the grid (40) to request movement of said cover means (41) relative to said lateral inlet (50).

16 Claims, 2 Drawing Sheets

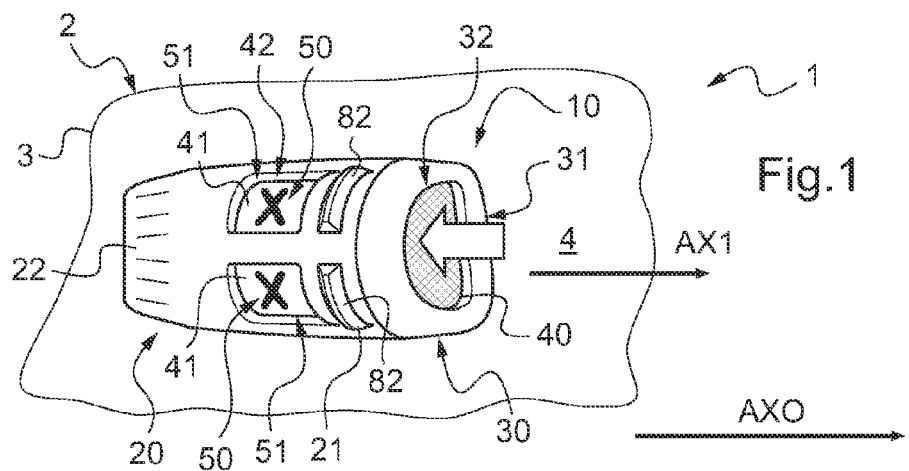
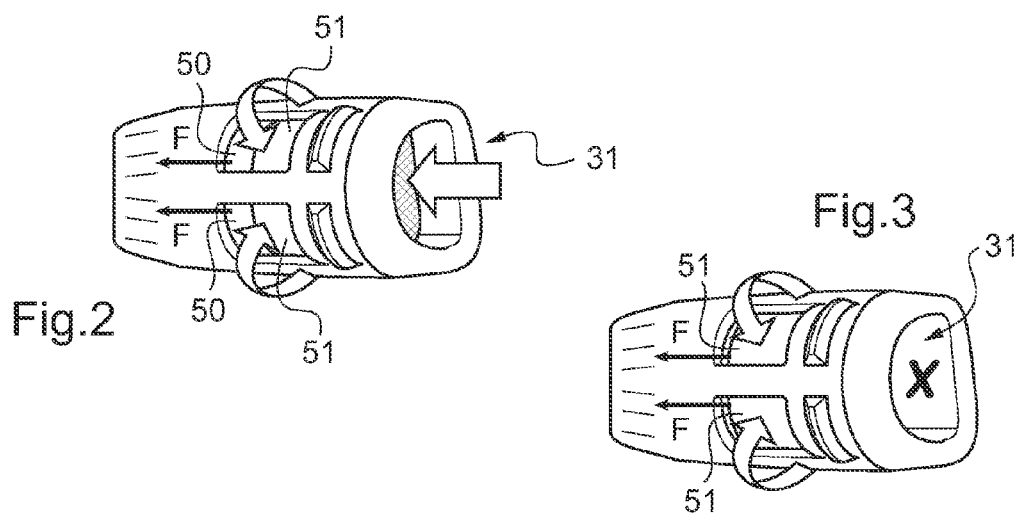
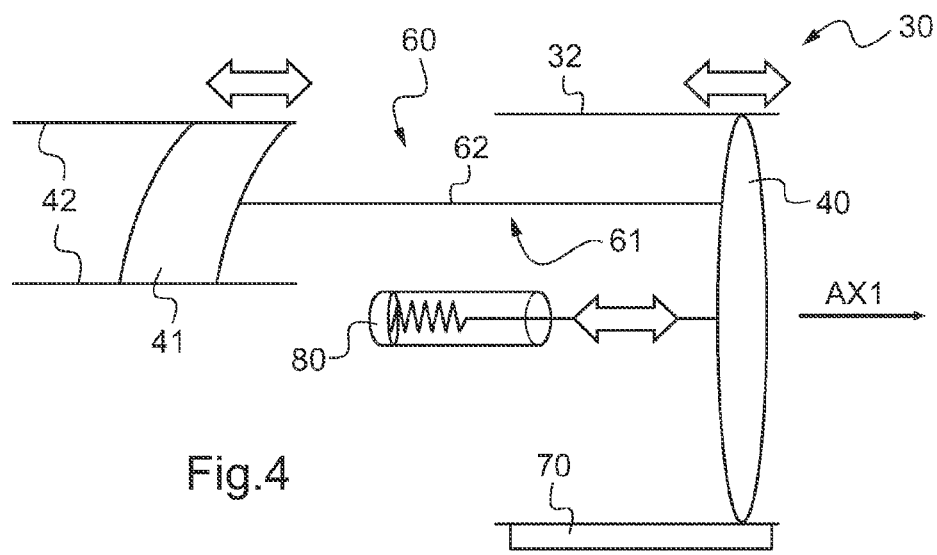

AIR INLET FOR AN AIRCRAFT TURBINE ENGINE, AN AIRCRAFT PROVIDED WITH SUCH AN AIR INLET, AND A METHOD OF OPTIMIZING THE OPERATION OF AN AIRCRAFT TURBINE ENGINE WITH THE HELP OF AN AIR INLET

CROSS REFERENCE TO RELATED APPLICATION

This application claims the benefit of FR 09 05435 filed Nov. 12, 2009, the disclosure of which is incorporated herein by reference.

FIELD OF THE INVENTION

The present invention relates to an air inlet for a turbine engine of an aircraft, e.g. a rotorcraft, to an aircraft provided with such an air inlet, and to a method of optimizing the operation of the turbine engine of an aircraft with the help of an air inlet.

BACKGROUND OF THE INVENTION

In particular, rotorcraft are called on to operate in a wide variety of environments and under extreme conditions, which means that the turbine engines of such a rotorcraft need to be protected in order to withstand such conditions.

In order to feed air to a rotorcraft turbine engine, the turbine engine is fitted with an air inlet, the air inlet being provided with a duct that connects outside air to the turbine engine. Two types of air inlet can be distinguished, namely:
 a dynamic air inlet fed with outside air under the effect both of the forward speed of the aircraft and of suction requested by the turbine engine; and
 a static air inlet that is fed solely with air under the effect of the suction requested by the turbine engine.

In order to prevent the turbine engine ingesting solid bodies that might damage it, e.g. birds, it is common practice to protect an air inlet with a grid. Said solid bodies are then blocked by the grid and do not run the risk of penetrating into the inside of the turbine engine.

Although effective, that solution presents a drawback under so-called "icing" flying conditions, and more particularly for dynamic air inlets. Under such flying conditions, icing occurs on the grid and thus obstructs the gaps through the grid in part or even completely.

Consequently, the air inlet can become partially or completely closed, which means that the power developed by the turbine engine will drop significantly, or even completely.

To remedy that, it is conceivable to make use of a grid that is overdimensioned. The dynamic air inlet has a flow area into which air penetrates dynamically into the dynamic air inlet, and the protected grid has first and second air flow sections, the first flow section facing the flow surface, unlike the second flow section. The grid can then be thought of as a kind of mushroom cap that covers the dynamic air inlet.

Thus, only the first flow section is liable to become iced. Under icing conditions, the second flow section then guarantees some minimum flow rate of air.

Such an overdimensioned grid is certainly ingenious. However it is found that dimensioning the grid is difficult. Furthermore, the overdimensioned grid possesses geometrical characteristics that are penalizing from an aerodynamic point of view, particularly since these characteristics are justified only when flying conditions are extreme.

Furthermore, aircraft pilots do not, a priori, have means enabling them to estimate the extent to which the first flow section of the overdimensioned grid has become clogged, and therefore have no means for deciding that a mission ought to be terminated because of advanced icing.

It should be observed that aircraft manufacturers have designed devices for protecting the air inlets of turbine engines so as to prevent any type of particle being ingested by such a turbine engine. For example, document FR 2 250 671 describes a multipurpose air inlet capable both of preventing particles being ingested by the turbine engine and of allowing flight under icing conditions without significant loss of performance from the turbine engine.

That multipurpose air inlet has a dynamic air inlet of annular shape forming a diverging section capable of being covered by a bullet-shaped member that moves axially. In addition the multipurpose inlet is provided with a cylindrical filtering inlet situated downstream from the dynamic inlet relative to the air flow direction, and provided on its outer periphery with a plurality of particle filters that act by inertia. When the anti-icing or anti-sand functions are activated, the bullet-shaped member blocks the dynamic air inlet so that all of the air ingested by the turbine engine passes through the filtering inlet, and more particularly through the particle filters.

These filters are provided with helical ramps that cause the air to swirl prior to penetrating into the inside of a tube having an outlet fitted with a separator that is concentric with the tube but of smaller diameter than the tube. Given the swirling movement generated by the helical ramp, a vortex phenomenon is observed at the inlet to each particle filter. Ice is then entrained towards the periphery of the vortex and ends up being deposited on the filtering inlet, more precisely on the outside edge of each particle filter, without blocking it. Thus, the filtering inlet prevents ice being absorbed in the turbine engine.

In its anti-sand mode of operation, the swirling movement of the air causes particles to be projected against the walls of the tube so that they cannot penetrate into the inside of the separator that serves to feed the turbine engine. Furthermore, a fan serves to extract the particles that have not passed through the separator on being projected against the walls of the tube.

Documents FR 1 585 516 and FR 1 548 724 both provide for implementing particle filters and describe a similar device.

Furthermore, in the state of the art that is remote from the invention, mention is made of document FR 2 924 471 that describes in particular compressible filter means, document EP 0 075 054 that uses a pivoting filter element, or indeed documents GB 577 799, WO 97/05942, and FR 2 538 453.

SUMMARY OF THE INVENTION

A particular object of the present invention is to propose a multipurpose air inlet that enables the above-mentioned limitations to be overcome, in particular allowing flight to take place under icing conditions without it being necessary to implement an overdimensioned turbine engine on a twin-engine aircraft.

An object of the present invention is thus to propose an alternative air inlet that is simple and inexpensive and suitable for operating under icing conditions, while possibly enabling a pilot to be informed that flying conditions are indeed icing conditions.

According to the invention, an air inlet of an aircraft turbine engine comprises an air delivery duct defined by a side wall, the air delivery duct being extended by a dynamic inlet duct, the dynamic inlet duct extending along a dynamic axis of the delivery duct towards a front flow section through which an apparent wind can penetrate into the air inlet, the dynamic axis being suitable for being substantially parallel to a longitudinal axis of the aircraft, the dynamic inlet duct being provided with a grid for protection against ingesting foreign bodies.

The inlet duct is said to be dynamic insofar as the apparent wind can penetrate therein without external assistance when the air inlet is arranged on an aircraft, in particular a rotorcraft.

The wind referred to as the "real" wind is the wind felt by a stationary body. Conversely, the wind referred to as the "speed" wind or more commonly as the "relative" wind is the wind felt by a body that is moving. The apparent wind is the vector sum of the real wind plus the relative wind.

The grid then separates the dynamic inlet duct longitudinally into two portions, an upstream portion and a downstream portion, for example. The terms upstream and downstream are then relative to the flow direction of air through the dynamic inlet duct. Conventionally, the grid is a lattice, e.g. a metal lattice.

The air inlet is remarkable in particular in that the grid is suitable for moving in translation along the dynamic axis relative to the front flow section, and the air inlet includes at least one lateral inlet arranged in the side wall of the delivery duct and cover means for covering the lateral inlet and that are also movable relative to the lateral inlet, the air inlet including movement means controlled by the movement in translation of the grid to request movement of the cover means relative to the lateral inlet.

When the grid is not clogged, each cover means completely covers the corresponding lateral inlet.

However, when the grid is clogged at least in part, e.g. under the effect of icing, the grid moves in translation in the delivery duct. More precisely, the grid moves away from the front flow section. This movement in translation causes the cover means to be moved by acting via the movement means. Under such circumstances, the first air stream entering via the front flow section is reduced because the grid is partially or completely clogged. Nevertheless, this reduction in the first air stream is compensated by the lateral inlet being opened in part or in full, so that a second air stream enters into the delivery duct via the lateral inlet.

It should be observed that the grid moves away from the front flow section firstly because of the pressure exerted by the apparent wind on the grid when it is clogged, and secondly because of the suction generated by the turbine engine. Similarly, the lateral inlet presents an angle relative to the front flow section, so air penetrates into the delivery duct via the lateral inlet by being sucked in by the turbine engine, or dynamically if the lateral inlet is parallel to the apparent wind.

The air inlet may also include one or more of the following characteristics.

The lateral inlet defining a lateral flow section suitable for allowing air to penetrate into the inside of the delivery duct, the movement means moves the cover means to adjust the area of the lateral flow section that is covered so as to control the flow rate of air passing through the lateral inlet as a function of the clogging of the grid, the air flow rate being maintained between a zero air flow rate and a predetermined maximum air flow rate.

The movement means, e.g. a plate, opens the lateral inlet as a function of the needs of the turbine engine to be fed. Thus, the lateral inlet is completely open when the grid is completely clogged so as to enable the maximum air flow rate to be supplied, whereas the lateral inlet is completely closed when the grid is not clogged at all.

Furthermore, the air inlet optionally includes first guide means for guiding movement in translation of the grid along the dynamic axis in the inlet duct. For example, the first guide means comprise rails located on the inside periphery of the dynamic inlet duct.

It is also conceivable to provide first electric heater means for heating the grid in order to limit icing of the grid. The heater means may also be constituted by a hot air takeoff, the hot air being taken from the turbine engine, for example, or indeed from an electric heater.

Furthermore, heating may be delivered with varying power, being stronger at the periphery of the grid than at the center of the grid. When the air inlet has first means for guiding movement in translation co-operating with the periphery of the grid, said heater means serve to avoid the grid becoming stuck to the guide means under icing conditions.

Likewise, the cover means are suitable for moving relative to the lateral inlet, and the air inlet includes second guide means for guiding the cover means.

It should be observed that the air inlet may include second heater means for heating the first and/or second guide means to avoid blocking movements of the grid and/or the cover means as a result of icing. The second heater means may comprise a hot air takeoff, said hot air being taken from the turbine engine for example, or from an electric heater.

In a first embodiment that is mechanical, the movement means comprise a mechanical connection connecting the grid to the cover means.

In a first example, the mechanical connection is a bar secured to the grid and to the cover means, said bar optionally being arranged along an axis parallel to the dynamic axis.

Thus, when the grid moves in translation, the movement means move the cover means in translation, thereby releasing the lateral inlet.

In this first example of the mechanical first embodiment, the cover means are thus constituted by a sliding hatch.

In a second example, the mechanical connection is a bar secured to the grid and hinged to the cover means via a crank. Thus, when the grid moves in translation, the movement means cause the cover means to move not in translation but rather in pivoting, thereby releasing the lateral inlet.

The cover means then comprise a tilting hatch in this second example of the mechanical first embodiment.

Optionally, it includes a position sensor suitable for sending information about the position of the grid in the dynamic inlet duct. From the position of the grid, it is possible by prior calibration to deduce the degree with which the grid is clogged, in order to inform the pilot, for example.

The position of the grid may be defined relative to the front flow section, for example. It should be observed that the position sensor is an ordinary position sensor. For example, the position sensor may be a sensor of the potentiometer, the variable inductance, or indeed the ultrasound type.

In a second embodiment that is electrical, the air inlet includes a position sensor suitable for sending information relating to the position of the grid in the dynamic inlet duct, such as a conventional position sensor, and the movement means include a first processor receiving the information and a movement motor suitable for moving the cover means, the first processor adjusting the position of the cover means relative to the lateral inlet by controlling the movement motor as a function of the information.

By way of example, the movement motor is connected to the cover means via a wormscrew. When the first processor detects that the grid has moved in translation, it controls the movement motor to rotate the wormscrew so as to cause the cover means to slide or pivot, depending on the variants selected.

The first processor may make use of an external memory that contains a relationship giving the position of the cover means as a function of the position of the grid, or indeed it may possess said memory within itself.

The invention can thus be implemented in a mechanical embodiment or in an electrical embodiment, each embodiment being capable of being presented in a variant that involves the cover means sliding or in a variant that involves the cover means pivoting.

Furthermore, the air inlet including a position sensor suitable for sending information relating to the position of the grid in the dynamic inlet duct, the air inlet may be provided with management means performing at least one of the following actions:
 said grid is heated by first heater means and said management means control said first heater means as a function of said information;
 the grid is guided by first guide means and/or the cover means are guided by second guide means, second heater means heating said first guide means and/or said second guide means, and said management means control said second heater means as a function of said information;
 said management means determine a clogging level of the grid as a function of said information and are suitable for informing a pilot who may, for example, decide to interrupt a mission as a function of said clogging level;
 mission profiles (emergency missions, conveying loads, . . . ) are stored in a first computer of the aircraft and said management means are suitable for sending said information to said first computer in order to modify said profiles in real time in flight as a function of the clogging level of the grid; and
 a second computer determines a given power that is to be delivered by said turbine engine at a given speed, and said management means are suitable for sending said information to said second computer to adjust said power as a function of the clogging level of the grid.

To this end, the management means may include a second processor and a memory for controlling first heater means for heating the grid, for controlling second heater means for heating the guide means of the grid and/or of the cover means, for modifying mission profiles, or indeed for blocking the turbine engine at some given power level as a function of the clogging of the grid.

In addition, the air inlet optionally includes at least one damper means for damping the movement in translation of the grid in order to guarantee that the movement of the grid in translation is due solely to the grid clogging and not to a violent apparent wind, for example.

The damper means may include one or more dampers. The damper may be a passive damper, e.g. implementing a piston and a rated spring, or resilient means based on a material selected from the group of elastomers, or an active damper of stiffness that varies as a function of predetermined parameters.

Thus, in a first option, the damper means include first and second damper means in series having first and second distinct stiffnesses. Thus, the following may optionally be selected:
 a first damper connected to the grid and having little stiffness so as to enable the grid to move progressively in translation; followed by
 a second damper connected to said first damper and having considerable stiffness to avoid the grid moving in translation under the effect of partial or total clogging and to enable energy to be absorbed as a result of an impact against the grid, e.g. as a result of colliding with a bird.

In a second option that is compatible with the first option, the air inlet includes adjustment means for adjusting the stiffness of at least one damper means as a function of the stage of flight and/or when a body strikes the grid with a predetermined force.

The damper means may in particular comprise a damper of hydraulic type, or pneumatic type, with the adjustment means setting the pressure of the fluid that is transmitted to a pressure that varies as a function of the situation.

Similarly, the damper could be of the electrical type.

Thus, the damper means may be active means, with the opening of the lateral inlet being controlled with filtering to avoid parasitic openings.

Such parasitic opening could be the result, for example, of the grid impacting against an object or a squall of wind. Such an impact tends to move the grid and thus to open the lateral inlet. However, if the grid returns to its initial position after said impact, there was no need to open the lateral inlet since the flow of air into the air inlet will return to its nominal conditions after the disturbance.

As a result, by adjusting the stiffness of the damper means, it is possible to avoid unnecessary movements, i.e. movements that are themselves disturbing. For example, when an impact is detected, the stiffness of the damper means is increased temporarily in order to prevent the grid moving in translation.

For this purpose, the adjustment means may make use of an optionally-dedicated grid position sensor in order to determine the acceleration of the grid. If the acceleration is greater than a threshold, it may be assumed that it is the result of an impact and not of progressive icing. Under such circumstances, the adjustment means increase the stiffness of the damper means to avoid opening the lateral inlet.

In a third option, that does not exclude the above-described first and second options, if the second embodiment is applied, then the movement motor may be activated on the basis of:
 a movement of the grid over a distance that is greater than a predetermined distance, e.g. a movement of the order of one centimeter; or indeed
 a movement of the grid that takes place during a period of time that is longer than a predetermined limit duration, e.g. of the order of one second.

Finally, it should be observed that the sending of information about clogging of the grid to the pilot may also be filtered on the same lines.

Furthermore, the air inlet is provided with a deflector element on said side wall upstream from said lateral inlet and suitable for deflecting an apparent wind and/or for retaining any captured ice that was in suspension in the air and that would otherwise tend to penetrate via the lateral air inlet.

In addition to an air inlet, the invention also provides an aircraft having a turbine engine, the aircraft being remarkable in particular in that it includes an air inlet of the invention as described above for feeding air to said turbine engine.

Finally, the invention also provides a method of optimizing the operation of a turbine engine of an aircraft with the help of an air inlet having an air delivery duct defined by a side wall, said air delivery duct being extended by a dynamic inlet duct, said dynamic inlet duct extending along a dynamic axis of said delivery duct towards a front flow section through which an apparent wind can penetrate into said air inlet, said dynamic axis being suitable for being substantially parallel to a longitudinal axis of said aircraft, said dynamic inlet duct being provided with a grid for protection against ingesting foreign bodies.

This air inlet is preferably an air inlet as described above.

Under such circumstances, during the method, said grid is suitable for moving in translation along said dynamic axis relative to said front flow section as a result of the grid becoming clogged, said air inlet including at least one lateral inlet formed in said side wall and cover means for covering said lateral inlet, the cover means being movable relative to said lateral inlet, and the cover means are moved relative to the lateral inlet in proportion with the movement in translation.

Optionally, at least one of the following actions is also performed:

said grid is heated by first heater means and said first heater means are controlled as a function of the position of said grid in said dynamic inlet duct, e.g. by adjusting the amount of electrical current delivered to the grid by the first heater means as a function of the position of the grid in said dynamic inlet duct;

the grid is guided by first guide means and/or the cover means are guided by second guide means, second heater means heating said first guide means and/or said second guide means, and said second heater means are controlled as a function of the position of said grid in said dynamic inlet duct;

a clogging level of the grid is determined as a function of the position of said grid in said dynamic inlet duct and this clogging level is supplied to a pilot of said aircraft;

mission profiles are stored in a first computer of said aircraft and the position of said grid in said dynamic inlet duct is sent to said first computer in order to modify said profiles in real time in flight as a function of the clogging of the grid; and a second computer determines a given power that is to be delivered by said turbine engine at a given speed, and the position of said grid in said dynamic inlet duct is sent to the second computer in order to adjust said power as a function of the clogging level of the grid.

These actions may be performed by members that are independent of the air inlet and that receive information coming from a grid position sensor, or they may be implemented by means for managing the air inlet.

BRIEF DESCRIPTION OF THE DRAWINGS

The invention and its advantages appear in greater detail from the following description with embodiments given by way of illustration with reference to the accompanying figures, in which:

FIG. 1 is a diagram showing lateral inlets covered by cover means;

FIG. 2 is a diagram showing lateral inlets partially covered by cover means;

FIG. 3 is a diagram showing lateral inlets that are not covered by cover means;

FIG. 4 is a diagram showing a first variant of a first embodiment;

Figure 5:
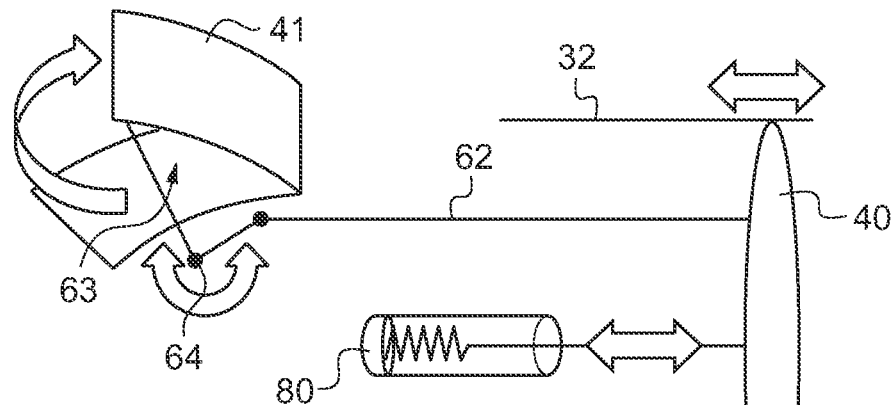
FIG. 5 is a diagram showing a second variant of a first embodiment.

Elements present in more than one of the figures are given the same references in each of them.

DETAILED DESCRIPTION OF THE PREFERRED EMBODIMENT

FIG. 1 shows an air inlet 10 of a turbine engine 2 of an aircraft 1. The air inlet 10 is arranged on the fuselage 3 of the aircraft 1 to feed the turbine engine 2 with air, which engine is located inside the fuselage 3.

The air inlet 10 has an air delivery duct 20 defined by a side wall 21, the delivery duct 20 then being a tunnel suitable for directing air towards a turbine engine 2. The delivery duct includes a bend 22 for conveying air towards a plenum of the turbine engine. Nevertheless, it can be understood that in order to feed a turbine engine having an axial air intake, the delivery duct may be elongate and lies in line with the axial air intake.

In addition to the delivery duct 20, the air inlet 10 has a dynamic inlet duct 30 extending the delivery duct 20. Under such circumstances, the dynamic inlet duct extends along a dynamic axis AX1 of the delivery duct 20 towards a front flow section 31 of said dynamic inlet duct, the dynamic axis AX1 being parallel to the longitudinal axis AX0 of the aircraft connecting the rear to the front of said aircraft 1.

The direction of the dynamic axis AX1 enables the apparent wind 4 to penetrate into the air inlet 10 via the front flow section 31 without any need for it to be sucked in by the turbine engine 2. The inlet duct 20 is said to be a dynamic inlet duct insofar as it enables the apparent wind to be captured without any external assistance, and in particular it enables the relative wind to be captured.

This air inlet 10 is ingeniously provided with a grid 40 to protect it against ingesting foreign bodies, such as birds or even ice, for example. The grid 40 is positioned inside the dynamic inlet duct 30 so as to cover the entire section of the tunnel formed by the dynamic duct.

The grid 40, e.g. a metal lattice, then subdivides the dynamic inlet duct 30 into two distinct portions, an upstream portion situated between the grid and the front flow section 31, and a downstream portion situated between the grid 40 and the delivery duct 20.

Furthermore, the air inlet includes at least one lateral inlet 50 formed in the side wall 21 of the delivery duct 20, and specifically it has two lateral inlets 50 in FIG. 1. Each lateral inlet is contained in a plane presenting an angle relative to the front flow section 31.

Each lateral inlet 50 thus defines a lateral flow section 51 enabling outside air to penetrate into the inside of the air inlet by suction or by the movement of said air relative to the lateral inlet, where applicable. Depending on said angulation, it is conceivable that the relative wind cannot penetrate into the air inlet via the lateral inlet 50.

Furthermore, the air inlet may include one deflector element 82 per lateral inlet in order to deflect the apparent wind 4 so as to avoid icing on said lateral inlet. Each deflector element 82 is consequently arranged on the side wall 41 upstream from the associated lateral inlet.

Each lateral inlet, and more precisely its lateral flow section, may be covered, i.e. obturated, in part or in full by associated cover means 41 such as a plate having the shape of the associated lateral flow section. It can thus be understood that each cover means 41 is movable relative to the corresponding lateral inlet 50.

Similarly, the grid 40 is movable relative to the dynamic inlet duct 30, e.g. relative to the front flow section 31. More precisely, this grid 40 is capable of moving in translation along said dynamic axis AX1. The grid 40 then slides in the dynamic inlet duct 30 to move towards or away from the front flow section 31.

Consequently, under icing conditions, it is possible for the grid 40 to become clogged. The pressure of the apparent wind on the clogged grid 40, associated with the suction that exists inside the air inlet as a result of suction from the turbine engine causes the grid to move away from the front flow section 31.

Under such circumstances, and according to the invention, the cover means 41 are moved relative to the lateral inlet in proportion to the movement in translation of the grid so as to open the lateral flow section 51 of the lateral inlet 50 in full or in part. It should be observed that the air inlet may be fitted with first guide means 32 and second guide means 42 respectively for guiding the grid 40 and the cover means 41 so as to avoid erratic movement of these members, and in particular so as to avoid these members jamming in translation.

With reference to FIG. 1, if the grid 40 is not clogged, then the grid 40 is in the front flow section 31. The cover means 41 then cover the lateral inlets, with complete covering being represented by a cross X.

Since the grid 40 is not clogged, the stream of air passing through the front flow section is sufficient to satisfy the needs of the turbine engine.

With reference to FIG. 2, the grid 40 is partially clogged, which explains why the grid 40 has moved in translation away from the front flow section 31.

Like the grid 40, each of the cover means has also moved, specifically in translation in the direction of arrow F in FIG. 2, so as to open in part the associated lateral inlet 50.

The flow of air entering via the front flow section 31 and via the partially connected lateral flow sections is then sufficient to satisfy the needs of the turbine engine. The partial clogging of the front flow section 31 is compensated by the partial opening of the lateral inlets 50.

Finally, with reference to FIG. 3, the grid 40 is completely clogged. The apparent wind can then no longer penetrate into the air inlet via the front flow section 31.

However, each of the cover means has moved, specifically in translation along an arrow F in FIG. 2, so as to fully open the associated lateral inlet 50.

The flow rate of air entering via the lateral flow sections partially covered by suction is then sufficient to satisfy the needs of the turbine engine. Total clogging of the front flow section 31 is compensated by the lateral inlets 50 being opened fully.

Each of the cover means then adjusts the effective associated lateral flow section 51 so as to control the flow rate of air passing through the lateral inlet, said air flow rate going from a zero air flow rate in FIG. 1 to a predetermined maximum air flow rate in FIG. 3. It should be observed that said maximum air flow rate is advantageously the maximum air flow rate required by the turbine engine.

Furthermore, the invention may include a position sensor serving to deliver an electrical signal relating to the position of the grid 40 in the dynamic inlet duct relative to the front flow section, or indeed relative to an initial position of the grid before clogging. Using this position sensor, it is possible in particular to perform at least one of the following actions:

- with the grid 40 being heated by first heater means, the first heater means are controlled as a function of the position of said grid 40 in said dynamic inlet duct 30;
- since the movement of the grid 40 is guided by first guide means, and/or since the movement of the cover means 41 is guided by second guide means, second heater means heating said first guide means and/or said second guide means can be controlled as a function of the position of said grid 40 in said dynamic inlet duct 30;
- a clogging level of the grid is determined as a function of the position of said grid 40 in the dynamic inlet duct 30 and this clogging level is supplied to the pilot of the aircraft;
- with mission profiles recorded in the memory of a first computer of said aircraft 1, the position of the grid 40 in said dynamic inlet duct 30 is sent to the first computer in order to modify said profiles in real time in flight as a function of the clogging level of the grid 40; and
- with a second computer determining a given power that needs to be delivered by the turbine engine at a given speed, the position of said grid 40 in the dynamic inlet duct 30 is sent to the turbine engine in order to adjust said power as a function of the clogging level of the grid 40.

In order to enable the cover means 41 and the grid 40 to be moved jointly, the air inlet includes movement means controlled by the movement in translation of the grid 40 for requesting movement of the cover means 41 relative to the associated lateral inlets 50.

With reference to FIGS. 4 and 5, in a first embodiment, the movement means 60 comprise a mechanical connection 61 mechanically and thus physically connecting the grid 40 to the cover means 41. It can be understood that if the air inlet is provided with a plurality of cover means, each cover means is connected via its own mechanical connection to the grid 40.

In the first example of FIG. 4, the mechanical connection 61 comprises a bar 62 secured to the grid 40 and to the cover means 41. Sliding of the grid 40 thus gives rise to sliding of the cover means 41.

FIG. 4 also shows first and second guide means 32 and 42 for guiding the grid 40 and the cover means 41 respectively. These first and second guide means 32 and 42 may be rails that guide the movement in translation of the grid 40 and of the cover means 41 along the dynamic axis AX1.

Furthermore, FIG. 4 shows an optional member serving firstly to avoid unwanted movements of the grid 40, and secondly to enable said grid to return to its initial position, i.e. its non-clogged position, as a result of said grid 40 moving in translation.

Under such circumstances, the air inlet 10 possesses damper means 80.

The damper means 80 may be a damper fastened to the side wall of the air inlet, and more particularly a damper provided with a rated spring. Nevertheless, it is possible to envisage using any type of damper, e.g. a damper provided with elastomer members, or hydraulic, pneumatic, or even electric dampers.

It should be observed that it is possible to arrange a plurality of dampers in series with two distinct dampers having distinct stiffnesses, for example.

Furthermore, means may be provided to adjust the stiffness of the damper means so as to make it possible on the ground or even in real time in flight to set the stiffness of the damper means as a function of predetermined parameters such as the stage of flight or indeed for example depending on the travel speed or the acceleration of the grid relative to the dynamic inlet duct. When the damper means comprise a pneumatic damper, it is possible to use the pressure of a gas taken from the turbine engine 2 that is fed from the air inlet.

Furthermore, the air inlet is provided with a position sensor 70 enabling information to be generated relating to the position of the grid 40. By way of example, this position sensor 70 is associated with a rail of the first guide means 32.

When the air inlet is provided with damper means provided with a moving portion, e.g. a piston, the position sensor may measure the position of said piston since it is in fact representative of the position of the grid 40.

If the damper means make use of fluids, the position sensor may monitor flow of those fluids or their pressure.

In the second example of FIG. 5, the mechanical connection 61 comprises not only a bar 62 secured to the grid 40 but also an L-shaped crank 63 suitable for pivoting about an axis 64.

Movement in translation of the grid 40 then generates rotary type movement of the cover means.

It is observed that if the air inlet 10 is provided with a plurality of lateral inlets, then both of the two above examples may be used together. Thus, a first cover means may be connected to the grid by movement means corresponding to the first example of FIG. 4 while a second cover means may be connected to the grid by movement means corresponding to the second example of FIG. 5.

Figure 6:
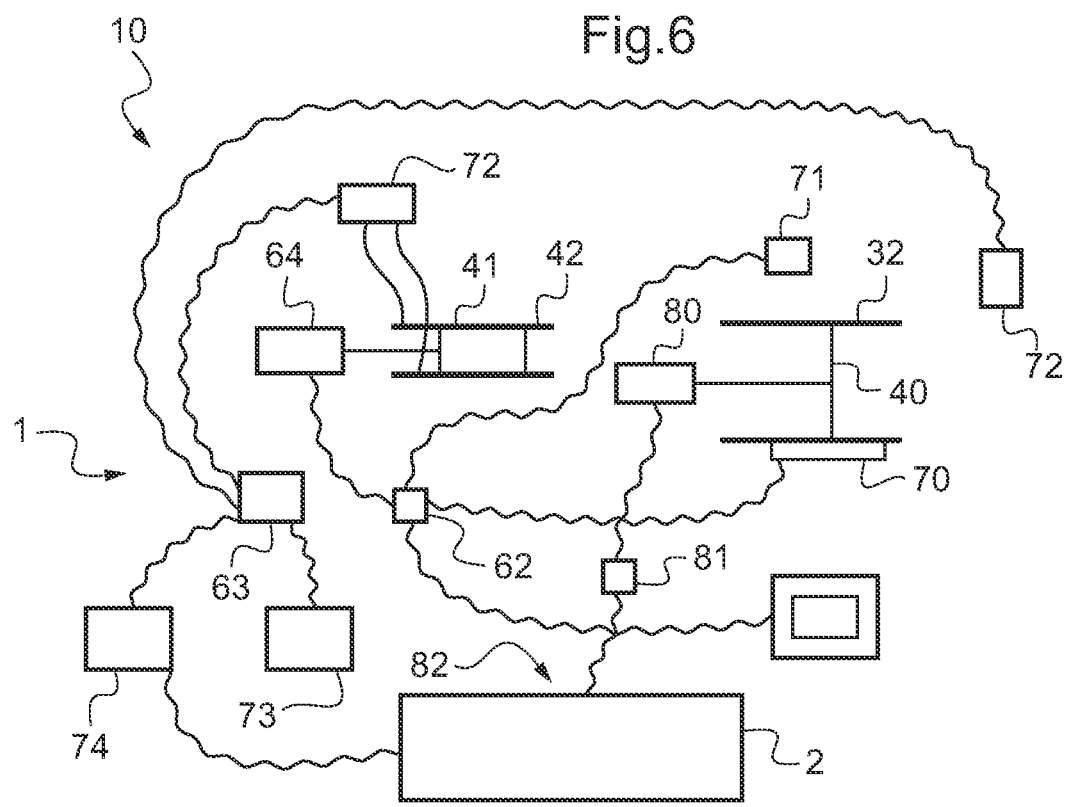
FIG. 6 is a diagram presenting a second embodiment.

With reference to FIG. 6, in an electrical second embodiment the movement means 60 comprise a first processor 62 and a movement motor 64.

The first processor 62 receives information relating to the position of the grid 40 in the dynamic inlet duct 30. This first processor 62 makes use of its own memory or of an auxiliary memory in order to determine the position that is to be reached by the cover means 41. Said memory may thus store a predetermined relationship giving the position of the cover means 41 as a function of the position of the grid 40.

Consequently, the first processor 62 controls the movement motor 64 so as to move the cover means 41 appropriately, e.g. by rotating a wormscrew.

Independently of the invention, the air inlet 10 may be provided with management means 63, such as a second processor having a memory or making use of an external memory and suitable for performing various actions as a function of information delivered by the position sensor relating to the position of the grid 40. Among these actions, the management means may control the first heater means 71 of the grid 40 as a function of said information, may control second heater means 72 for heating the first and/or second guide means 32, 42 as a function of said information, may determine a clogging level of the grid 40 as a function of said information and deliver said clogging level to a pilot of the aircraft, may send said information to a first computer 73 for modifying mission profiles in real time in flight as a function of the clogging level of the grid 40, and/or may send said information to a second computer 74 for adjusting the power delivered by the turbine engine 2 as a function of the clogging level of the grid 40.

It should be observed that the management means 63 and the first processor 62 may be implemented using a single processor.

Finally, FIG. 6 shows damper means 80 for damping the grid that are provided with adjustment means 81 interposed between an intake 82 for pressurized gas from the turbine engine 2 and said damper means 80.

Naturally, the present invention may be subjected to numerous variations as to its implementation. Although several embodiments are described above, it will readily be understood that it is not conceivable to identify exhaustively all possible embodiments. It is naturally possible to envisage replacing any of the means described by equivalent means without going beyond the ambit of the present invention.

What is claimed is:

1. An air inlet for a turbine engine of an aircraft, the inlet including an air delivery duct defined by a side wall, said air delivery duct being extended by a dynamic inlet duct, said dynamic inlet duct extending along a dynamic axis of said delivery duct towards a front flow section through which an apparent wind can penetrate into said air inlet, said dynamic axis being substantially parallel to a longitudinal axis of said aircraft, said dynamic inlet duct being provided with a grid for protection against ingesting foreign bodies, wherein said grid is movable in translation along said dynamic axis relative to said front flow section as a result of said grid becoming clogged, and said air inlet includes at least one lateral inlet arranged in said side wall and cover means for covering said lateral inlet that are movable relative to said lateral inlet, said air inlet including movement means controlled by said movement in translation of said grid to cause movement of said cover means relative to said lateral inlet.

2. An air inlet according to claim 1, wherein said lateral inlet defines a lateral flow section suitable for allowing air to penetrate into the inside of said delivery duct at a given air flow rate, and said movement means moves said cover means to adjust the area of said lateral flow section that is covered so as to control the flow rate of air passing through said lateral inlet as a function of the clogging of said grid, said air flow rate being maintained between a zero air flow rate and a predetermined maximum air flow rate.

3. An air inlet according to claim 1, wherein said air inlet includes first guide means for guiding movement in translation of said grid along said dynamic axis (AX1) in said inlet duct.

4. An air inlet according to claim 1, wherein said cover means are suitable for moving relative to said lateral inlet, and said air inlet includes second guide means for guiding said cover means.

5. An air inlet according to claim 1, wherein said movement means comprise a mechanical connection connecting said grid to said cover means.

6. An air inlet according to claim 1, including a position sensor suitable for sending information about the position of said grid in said dynamic inlet duct.

7. An air inlet according to claim 1, wherein said air inlet includes a position sensor suitable for sending information relating to the position of said grid in said dynamic inlet duct, and said movement means include a first processor receiving said information and a movement motor suitable for moving said cover means, said first processor adjusting the position of said cover means relative to said lateral inlet by controlling said movement motor as a function of said information.

8. An air inlet according to claim 1, wherein said air inlet includes a position sensor suitable for sending information relating to the position of said grid in said dynamic inlet duct, and said air inlet is provided with management means performing at least one of the following actions:

said grid is heated by first heater means and said management means control said first heater means as a function of said information;

said grid is guided by first guide means and/or said cover means are guided by second guide means, second heater means heating said first guide means and/or said second guide means, and said management means control said second heater means as a function of said information;

said management means determine a clogging level of said grid as a function of said information and are suitable for informing a pilot of said aircraft about said clogging level;

mission profiles are stored in a first computer of said aircraft and said management means are suitable for sending said information to said first computer in order to modify said profiles in real time in flight as a function of the clogging level of said grid; and a second computer determines a given power that is to be delivered by said turbine engine at a given speed, and said management means are suitable for sending said information to said second computer to adjust said power as a function of the clogging level of said grid.

9. An air inlet according to claim 1, including at least one damper means for damping said movement in translation of said grid.

10. An air inlet according to claim 1, including first and second damper means having first and second distinct stiffnesses.

11. An air inlet according to claim 9, including adjustment means for adjusting the stiffness of at least one damper means as a function of the stage of flight and/or when a body strikes said grid with a predetermined force.

12. An air inlet according to claim 1, including a deflector element on said side wall upstream from said lateral inlet and suitable for deflecting an apparent wind.

13. An aircraft provided with a turbine engine, wherein the aircraft includes an air inlet according to claim 1 in order to feed air to said turbine engine.

14. A method of optimizing the operation of a turbine engine of an aircraft with the help of an air inlet having an air delivery duct defined by a side wall, said air delivery duct being extended by a dynamic inlet duct, said dynamic inlet duct extending along a dynamic axis of said delivery duct towards a front flow section through which an apparent wind can penetrate into said air inlet, said dynamic axis being substantially parallel to a longitudinal axis of said aircraft, said dynamic inlet duct being provided with a grid for protection against ingesting foreign bodies, in which method said grid is movable in translation along said dynamic axis relative to said front flow section as a result of said grid becoming clogged, said air inlet including at least one lateral inlet formed in said side wall and cover means for covering said lateral inlet, said cover means being movable relative to said lateral inlet, and said cover means are moved relative to said lateral inlet in proportion with, and in response to, said movement in translation.

15. A method according to claim 14, wherein at least one of the following actions is performed:

said grid is heated by first heater means and said first heater means are controlled as a function of the position of said grid in said dynamic inlet duct;

said grid is guided by first guide means and/or said cover means are guided by second guide means, second heater means heating said first guide means and/or said second guide means, and said second heater means are controlled as a function of the position of said grid in said dynamic inlet duct;

a clogging level of said grid is determined as a function of the position of said grid in said dynamic inlet duct and said clogging level is supplied to a pilot of said aircraft;

mission profiles are stored in a first computer of said aircraft and the position of said grid in said dynamic inlet duct is sent to said first computer in order to modify said profiles in real time in flight as a function of the clogging level of said grid; and a second computer determines a given power that is to be delivered by said turbine engine at a given speed, and the position of said grid in said dynamic inlet duct is sent to the second computer to adjust said power as a function of the clogging level of said grid.

16. An air inlet for a turbine engine of an aircraft, the inlet including an air delivery duct defined by a side wall, said air delivery duct being extended by a dynamic inlet duct, said dynamic inlet duct extending along a dynamic axis of said delivery duct towards a front flow section through which an apparent wind can penetrate into said air inlet, said dynamic axis being substantially parallel to a longitudinal axis of said aircraft, said dynamic inlet duct being provided with a grid for protection against ingesting foreign bodies, wherein said grid is movable in translation along said dynamic axis relative to said front flow section as a result of said grid becoming clogged, and said air inlet includes at least one lateral inlet arranged in said side wall and a cover for covering said lateral inlet, said cover being movable relative to said lateral inlet in response to said movement in translation of said grid to cause movement of said cover relative to said lateral inlet.

* * * * *